Nov. 4, 1952     L. M. HAUGEN     2,616,591
VOLUMETRIC PACKAGING MACHINE
Filed Aug. 6, 1949     2 SHEETS—SHEET 2
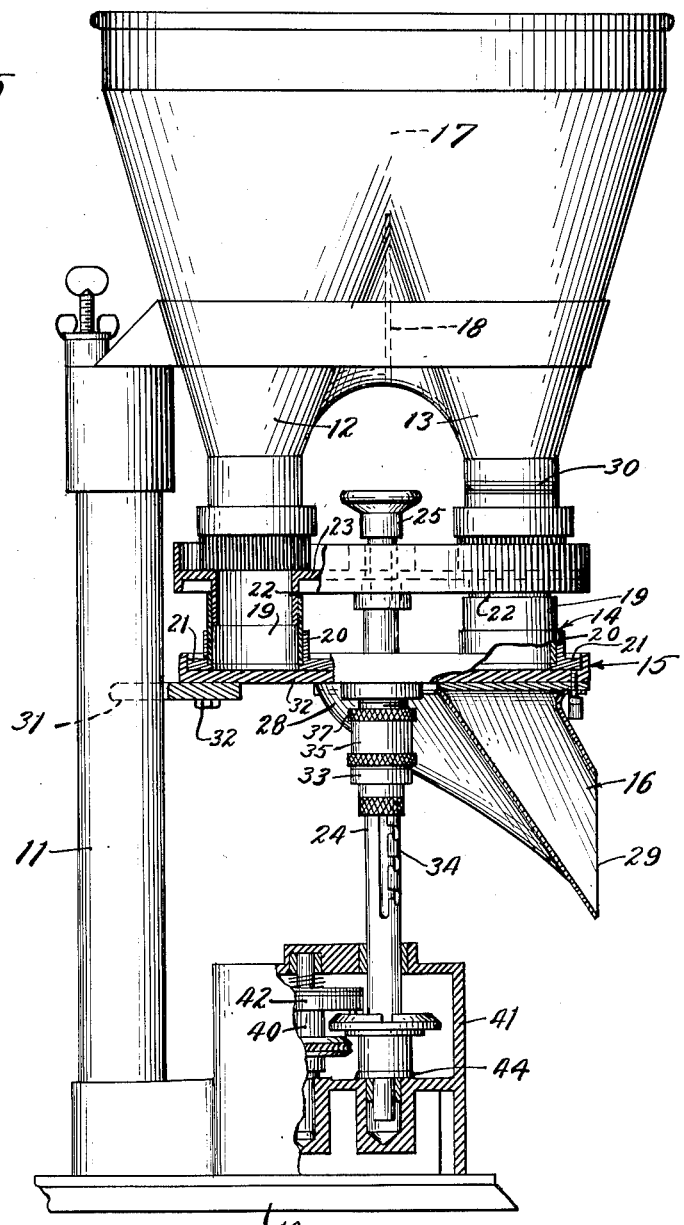

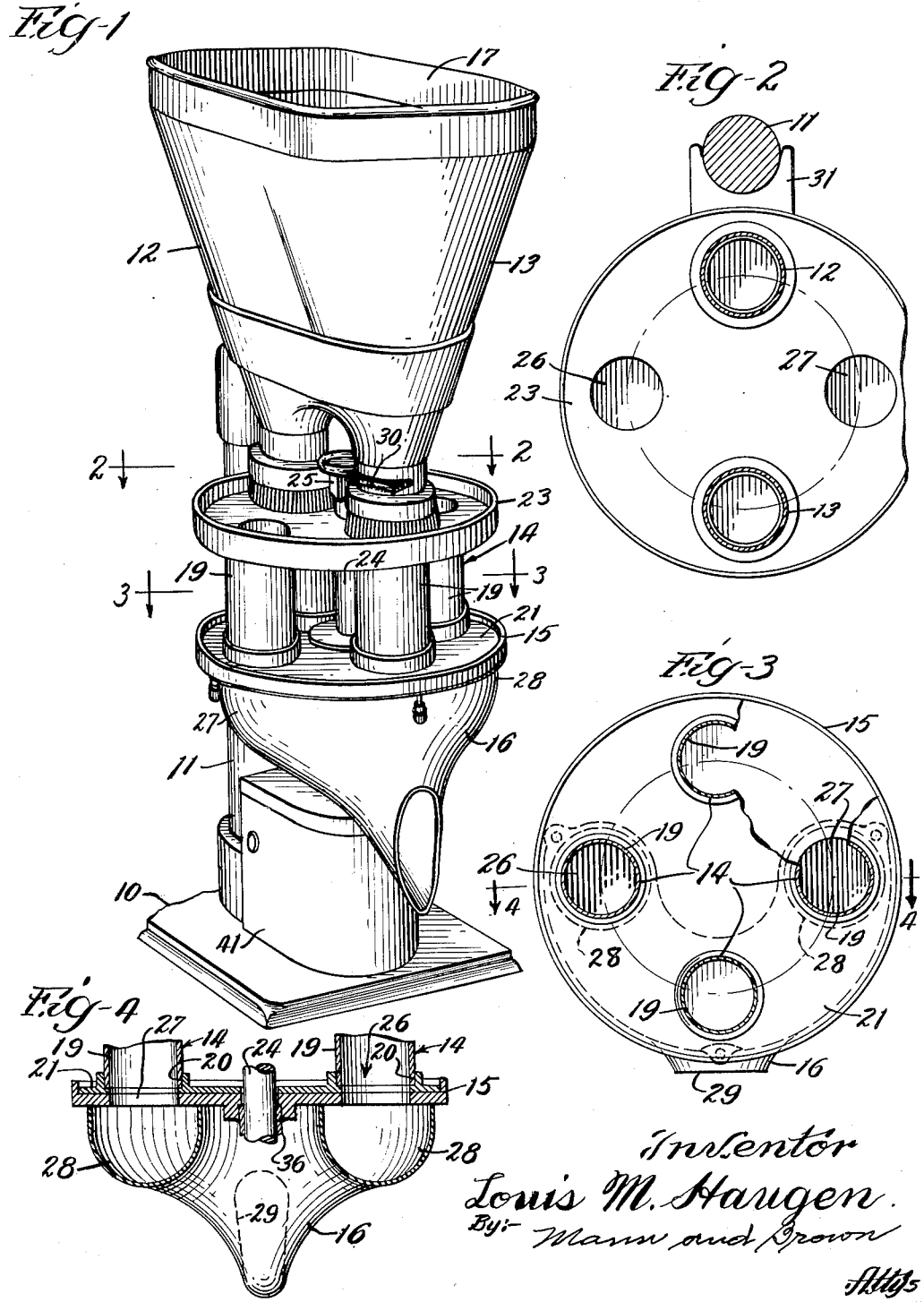

Patented Nov. 4, 1952　　　　　　　　　　　　　　　　　　　　　　　　　　2,616,591

UNITED STATES PATENT OFFICE 2,616,591

VOLUMETRIC PACKAGING MACHINE

Louis M. Haugen, Chicago, Ill., assignor to Paul L. Karstrom Co., a corporation of Illinois Application August 6, 1949, Serial No. 108,973

7 Claims. (Cl. 222—141)

1

In volumetric package filling machines, a hopper delivers fluent material into measuring devices travelling in a circuit over a table provided with a spout delivering to a carton or jar, or other container. With some materials and quantities, the number of packages that can be filled per minute becomes limited by the time required for the material to move through each measuring device.

The object of this invention is to avoid that limit. Generally speaking, this is accomplished by making a plurality of measuring devices work together on a desired quantity of material, each contributing its separate portion simultaneously with the other to make up the whole in correspondingly less time. Thus, in the preferred embodiment for a package filling machine for rice and beans (which have long presented the limiting problem) two hoppers supply two equal measuring devices which deliver simultaneously through a common spout to fill the carton with the sum of the two, or twice as much as could be had from one measuring device in the same time.

Further objects and advantages of the invention will appear as the disclosure proceeds and the description is read in connection with the accompanying drawings, in which—

Fig. 1 is a perspective view of the preferred embodiment of the invention;

Figs. 2 and 3 are horizontal sections on the lines 2—2 and 3—3 of Fig. 1;

Fig. 4 is a vertical section on the line 4—4 of Fig. 3; and

Fig. 5 is a side elevation partly in section.

The base 10 of the machine carries a column 11 for supporting hoppers 12 and 13, which deliver fluent material through a series of measuring devices, generally indicated by 14, rotating in a circuit over a stationary table 15 having a spout 16 adapted to deliver to a bag, carton, jar, or the like.

The hoppers 12 and 13 may lead from a common bin 17, or such a bin divided by a partition 18.

The measuring devices include sleeves 19 telescoping at their lower ends in sockets 20 in a bottom plate 21, and at their upper end telescoping with tubular projections 22 on a top plate 23 driven by a shaft or standard 24 to which it is keyed and made fast by a threaded knob 25.

The table 15 is provided with spaced discharge openings 26 and 27 through which the measured material passes to the arms or channels 28 of the spout 16, which is forked to make these channels lead from the discharge openings to a common delivery opening 29.

The hoppers 12 and 13 are aligned fore and aft, 12 being at the rear and 13 at the front of the machine, and the discharge openings 26 and 27 are aligned crosswise to the shortest line between the hoppers, or a line running through the axis of the machine and from front to rear. Thus, it will readily appear that when the measuring devices 14 are being rotated, the hoppers will deliver simultaneously and to the two aligned measuring devices fore and aft while the other two aligned measuring devices 14 will deliver to the discharge openings 26 and 27, and hence to the spout 16. Thus, just twice the amount of material can be packaged as would be possible with conventional machines having but one measuring device deliver at a time.

The measuring devices are varied in capacity by changing the amount with which the cups 19 telescope with the sockets 20 and the flanges 22, and also by using cups of different length.

By supplying measuring devices with capacities of 1 pound, 1½ pounds, 2 pounds, and 2½ pounds, the filler will operate to fill packages of 2, 3, 4, and 5 pounds of material in the same time as the ordinary machine will fill packages of just half that amount.

By providing one of the hoppers—for example, 13—with a gate valve 30 by which it can be opened or closed, this machine can be made to function as the ordinary machine, and also as above described. With measuring devices of the capacities mentioned, the 1-pound cups would discharge 1 pound only with the hopper 12 alone open; 2 pounds with both open. The 1½-pound cups would discharge 1½ pounds with the hopper 12 open; 3 pounds with both hoppers open, etc.

The table 15 is held stationary by a fork 31 astride column 11 and made fast to the table by a bolt 32, and the table is supported on the standard 24 by an adjustable collar 33 having selective bayonet joint connection with the standard, as indicated at 34, and the bearing sleeve 35 threaded on a nipple 36 fixed to the table, and thereby affording fine adjustment for the height of the table. The sleeve is locked in adjusted position by a locking ring 37.

This adjustable support for the table is more fully described in my copending application filed of even date herewith.

The standard 24, and therefore the measuring devices, are driven by suitable gearing 40 in a gear casing 41 on the base 10, and preferably the gearing includes a modified Geneva movement 42 whereby the standard and the measuring devices are given a step-by-step movement with pauses between movements of a length suitable to the time required for the fluent material to pass from the hoppers 12 and 13 into the measuring devices, and from the measuring devices out through the discharge openings 26 and 27 and the spout 16.

The standard 24 is supported by a thrust bearing 44 in the casing 41.

I claim:

1. A volumetric packaging machine comprising a plurality of hoppers having discharge openings, a vertical standard, a table vertically slidable on said standard and fixed against rotation, said table having a plurality of spaced discharge openings aligned crosswise of said hoppers, a spout attached to the under side of said table and communicating with said table discharge openings, and telescopically adjustable rotatable measuring devices resting on said table for simultaneous registration with said hopper discharge openings and said table discharge openings, whereby while a plurality of measured quantities of material is being received from said hoppers another plurality of measured quantities of material is being discharged to said spout.

2. A volumetric packaging machine comprising a plurality of hoppers having discharge openings, a vertical standard, a table vertically slidable on said standard and fixed against rotation, said table having a plurality of spaced discharge openings aligned crosswise of said hoppers, a spout attached to the under side of said table and communicating with said discharge openings, and a unitary rotatable measuring means resting on said table, said means comprising an upper plate, a lower plate, and a plurality of individual measuring sleeves telescopically mounted therebetween and disposed for simultaneous registration with said hopper discharge openings and said table discharge openings, whereby while a plurality of measured quantities of material is being received from said hoppers another plurality of measured quantities of material is being discharged to said spout.

3. A volumetric packaging machine comprising a base, a column attached to said base, a plurality of hoppers having circumferentially spaced lower discharge ports, a vertical standard, a table beneath said hoppers vertically slidable on said standard and fixed against rotation, said table having a plurality of discharge openings spaced circumferentially similarly to, but below and intermediate of, the lower discharge ports of said hoppers, a spout attached to the under side of said table and communicating with said discharge openings, and rotatable measuring means attached to said standard and resting on said table to receive simultaneously from said hoppers and convey simultaneously to said discharge openings, said means comprising an upper plate, a lower plate, each of said plates having a plurality of circumferentially spaced openings, and a plurality of telescopically mounted measuring sleeves, each sleeve connecting one of the plurality of openings in the upper plate with one of the plurality of openings in the lower plate.

4. A volumetric packaging machine comprising a base, a column attached to said base, a plurality of hoppers carried by said column and having aligned lower discharge ports, a driving mechanism mounted on said base, a rotatable standard extending upwardly from and driven by said driving mechanism, an adjustable bearing sleeve mounted on said standard, a table fixed against rotation and supported by said bearing sleeve, said table having a plurality of discharge openings circumferentially spaced intermediate of the lower discharge ports of said hoppers, a side delivery spout attached to the lower surface of said table and communicating with said discharge openings, a rotatable circular bottom plate resting on said table, said bottom plate having a plurality of circumferentially equally spaced openings registrable with the openings in said table, a plurality of sockets mounted on said bottom plate, each of said sockets registering with one of said openings in said bottom plate, a measuring sleeve mounted within each of said sockets, a tubular projection telescopically mounted within each of said sleeves to receive material from said hoppers and deliver it through said measuring sleeves, and a circular upper plate attached to said standard and said tubular projections, said upper plate having a plurality of equally spaced discharge openings aligned with said tubular projections and the lower discharge ports of said hoppers.

5. In a volumetric package filling machine, two spaced hoppers having circumferentially positioned discharge openings, a table beneath the hoppers having two correspondingly spaced and circumferentially positioned discharge openings aligned crosswise to the alignment of the hopper discharge openings and communicating with a common delivery spout, a unitary measuring device comprising a series of measuring sleeves mounted for movement in a common closed path beneath said hopper discharge openings and over said table discharge openings, the spacing and arrangement of said sleeves being such that one pair of sleeves will register with said hopper discharge openings to receive measured quantities of material from said hoppers while another pair of sleeves simultaneously registers with said table discharge openings to deliver material therethrough to said common delivery spout.

6. In a volumetric package filling machine, a plurality of spaced hoppers having circumferentially arranged discharge openings, a table beneath the hoppers having a plurality of discharge openings corresponding in number spacing and arrangement to but offset circumferentially from said hopper discharge openings, said table discharge openings communicating with a common delivery spout, and a measuring device rotatably mounted between said hoppers and table and including a plurality of measuring sleeves, said measuring sleeves being circumferentially spaced and positioned to register with said hopper discharge openings in one position of rotation of said measuring device, whereby said sleeves simultaneously receive measured quantities of material from said hoppers, and to subsequently register with said table discharge openings in another position of rotation of said measuring device, whereby the measured quantities of material carried in said sleeves are simultaneously discharged through said table discharge openings to said common delivery spout.

7. A volumetric package filling machine of the type set forth in claim 6 including a further plurality of measuring sleeves circumferentially spaced and positioned for successive registration with said hopper discharge openings and said table discharge openings in alternation with said first named plurality of sleeves, whereby while one plurality of sleeves receives measured quantities of material from said hoppers the other plurality of sleeves simultaneously discharges measured quantities of material through said table discharge openings.

LOUIS M. HAUGEN.

REFERENCES CITED

The following references are of record in the file of this patent:

UNITED STATES PATENTS

| Number | Name | Date |
|---|---|---|
| 298,904 | Sheppard | May 20, 1884 |
| 867,074 | Pearce | Sept. 24, 1907 |
| 1,065,793 | Ferber | June 24, 1913 |
| 1,618,118 | Vartabedian | Feb. 15, 1927 |
| 2,240,610 | Dean | May 6, 1941 |
| 2,527,960 | Rapp | Oct. 31, 1950 |